(12) United States Patent
Chida

(10) Patent No.: US 6,760,369 B1
(45) Date of Patent: Jul. 6, 2004

(54) MULTI-FUNCTION PERIPHERAL DEVICE

(75) Inventor: Susumu Chida, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/291,191

(22) Filed: Apr. 14, 1999

(30) Foreign Application Priority Data

Apr. 15, 1998 (JP) .......................................... 10-105022

(51) Int. Cl.[7] .................................................. H04J 3/22
(52) U.S. Cl. ..................................... 375/225; 370/468
(58) Field of Search ................................ 375/225, 246, 375/370; 370/468, 465, 474

(56) References Cited

U.S. PATENT DOCUMENTS

| | | | | |
|---|---|---|---|---|
| 4,443,863 A | * | 4/1984 | Busch et al. ................. | 345/537 |
| 5,007,054 A | * | 4/1991 | Lee et al. .................... | 714/748 |
| 5,226,040 A | * | 7/1993 | Noble, III et al. ........... | 370/257 |
| 6,064,678 A | * | 5/2000 | Sindhushayana et al. ... | 370/470 |
| 6,078,582 A | * | 6/2000 | Curry et al. ................. | 370/356 |
| 6,259,723 B1 | * | 7/2001 | Miyashita .................... | 375/141 |

FOREIGN PATENT DOCUMENTS

| | | |
|---|---|---|
| JP | A-4-356836 | 12/1992 |
| JP | A 5-75666 | 3/1993 |
| JP | A-5-265416 | 10/1993 |
| JP | A 9-224097 | 8/1997 |

* cited by examiner

*Primary Examiner*—Khai Tran
*Assistant Examiner*—Kevin M. Burd
(74) *Attorney, Agent, or Firm*—Oliff & Berridge, PLC

(57) ABSTRACT

When the power source of a personal computer is on (S22:ON) and when the communication software of the personal computer is running (S23:YES), then the reception speed of transmission data serially transmitted from a remote device is written in the reception speed counter in S24. The size of a single packet of transmission data, to be transferred to the personal computer, in changed based on the value stored in the reception speed counter. Accordingly, for any value of the reception speed, a transfer interval can be maintained in a fixed value so that the communication software in the personal computer will generate no time-out error signal.

17 Claims, 9 Drawing Sheets

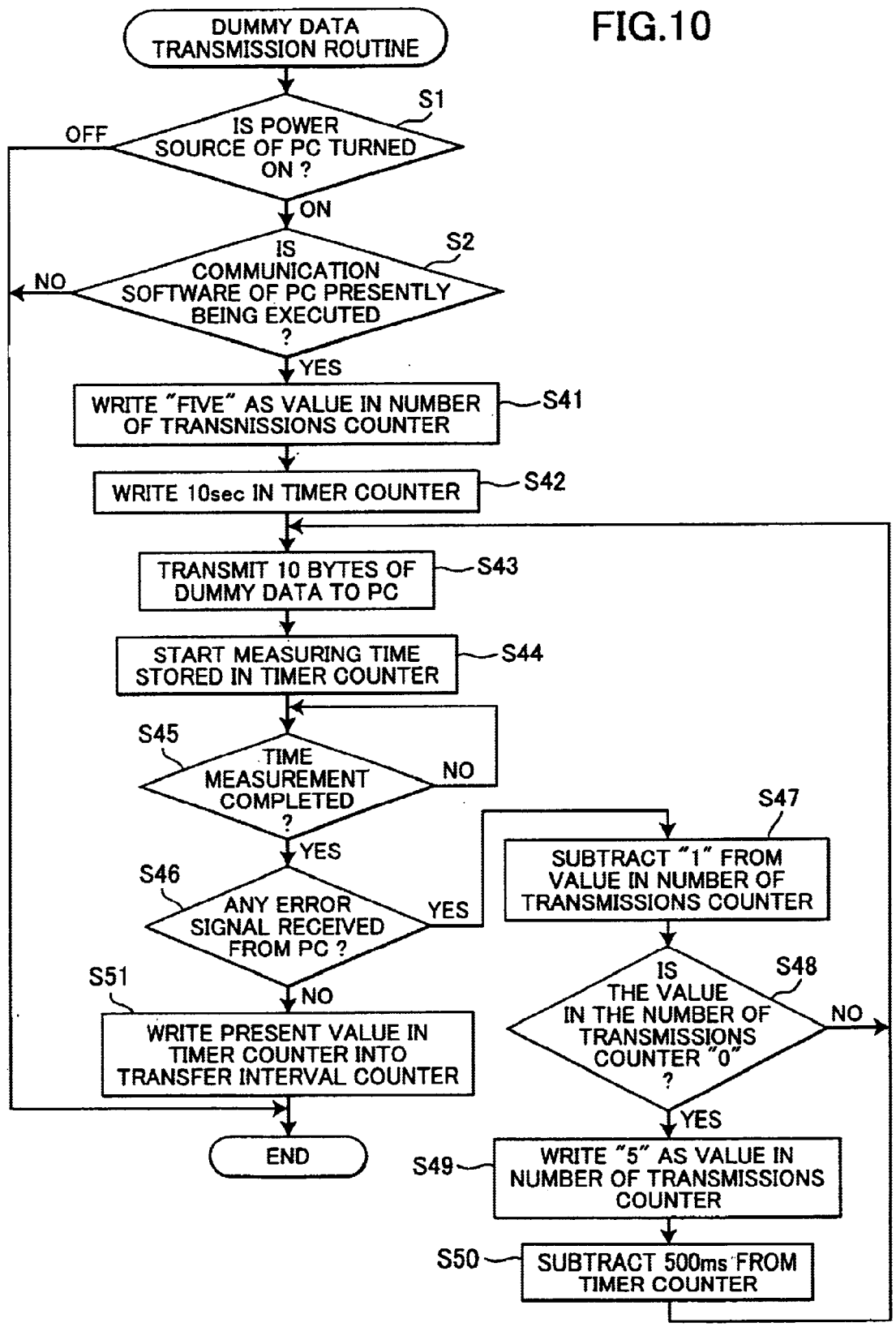

MULTI-FUNCTION PERIPHERAL DEVICE

BACKGROUND OF THE INVENTION

1. Field of the Invention

The present invention relates to a multi-function peripheral device capable of performing a variety of functions, such as a facsimile function and a modem function.

2. Description of Related Art

In recent years, multi-function peripheral devices capable of performing a variety of different functions, such as a facsimile function, a copy function, and a modem function, have become popular.

SUMMARY OF THE INVENTION

When a multi-function peripheral device is connected in serial with a remote device, the multi-function peripheral device can receive transmission data transmitted in succession one bit at a time from the remote device, it is conceivable that the multi-function peripheral device be designed to transfer the received transmission data to an external device such as a personal computer.

Data can be transferred to the external device using packet transmission. That is, each time the multi-function peripheral device receives a predetermined amount of transmission data, the multi-function peripheral device transfers the received transmission data to the external device as packet data. The multi-function peripheral device can transfer transmission data to the external device more efficiently in packets than when transferring the transmission data serially one bit at a time.

In the packet transmission, packet data, including a header portion and a data portion, is transmitted as a single group of data. The header portion indicates the length of data in the packet, and the data portion includes the actual data of interest. When the external device receives the packet data, the external device recognizes the data portion and the end of the packet data based on the data length indicated in the header portion. The external device retrieves the data from the data portion and performs processings such as storing the data in a memory of the external device itself.

In this conceivable packet data transfer operation, however, the transfer amount, that is, the amount of data in a single packet, is fixed. Therefore, when a reception speed, at which the multi-function peripheral device receives transmission date from the remote device, is relatively high, the transmission data will quickly accumulate to an amount sufficient to make a packet. In this case, the interval between successive packet transfers becomes relatively short. On the other hand, when the reception speed is relatively slow, relatively a long period of time will be required to accumulate transmission data sufficient to form a transfer packet. As a result, the interval between transfers of packets will become relatively long. When the period of time between transfers of packets is too long, then the external device will generate an error (time-out error) because excessive time has elapsed since the last packet has been received. Such an error can result in termination of transfer operations. Transfer processes can not be precisely performed.

It is therefore an objective of the present invention to overcome the above-described problems and provide an improved multi-function peripheral device that is capable of changing a transfer amount of transmission data, to be transferred to an external device in each packet, in accordance with the reception speed of the transmission data.

In order to attain the above and other objects, the present invention provides a multi-function peripheral device, comprising: means capable of receiving transmission data serially transmitted from a remote device; means for identifying a reception speed, at which the reception means receives the transmission data, means for changing, based on the identified reception speed, an amount of the transmission data to be transferred to an external device as a data unite and means for transferring, to the external device, the received transmission data by successive data units, each data unit being comprised of the changed amount of the transmission data.

Accordingly, the amount of transmission data, to be transferred at a time in a data unit to the external device, can be changed dependently on the reception speed. In the case where the reception speed is slow, the amount of transmission data, to be transferred as a data unit to the external device, can be made smaller than the amount of transmission data, to be transferred as a data unit to the external device when the reception speed in high. It is therefore possible to prevent the time interval, at which successive data units of the transmission data are transferred to the external device, from increasing even when the reception speed is low. It is possible to prevent the external device from generating a time-out error even in the case where the reception speed is slow.

The transferring means may transfer the transmission data in parallel to the external device. Accordingly, the transform speed con be made large in comparison with the reception speed.

The changing means may include, transfer timer storing means for storing data of a period of time, during which the serially-received transmission data is accumulated into each of the successive data units s and means for changing the amount of the transmission data, to be accumulated into each data unit, dependently on the identified reception speed and the period of time stored in the transfer time storing means.

With this structure, it is possible to change the period of time, during which the transmission data is to be accumulated into each data unit. Accordingly, the amount of transmission data, to be transferred in each data unit, can be changed to a desired value. For example, the period of time, during which the transmission data is to be accumulated into each data unit, can be made as long as possible within a range wherein the external device will generate no time-out errors. In this case, it is possible to set an large an possible the amount of transmission data to be transferred in each data unit. Accordingly, transmission data can be transferred to the external device with high efficiency.

The multi-function peripheral device may further comprises first transmission means for transmitting day data to the external device; time measuring means for measuring time elapsing after the first transmission transmits dummy data to the external device; error signal reception mans for receiving a time-out error signal from the external device time out period storing means for, when the error signal reception means receives the time out error signal, storing data of a time measured by the time measuring means to have elapsed until a time-out error signal is received; and first control means for controlling the transfer timer storing means to store data of the period of time, during which transmission data is to be accumulated into each data unit, based on data of the time stored in the time out period storing means.

With this structure, dummy data is experimentally transmitted to the external device so that the external device will generate a time-out error. Based on time elapsed until a signal indicative of the time-out error is received, the time period, during which transmission data should be accumulated into each data unit, can be automatically set as appropriate for the external device.

Or, the multi-function peripheral device may further comprises second transmission means for repeatedly transmitting dummy data to the external device at a time interval; first transmission time interval storage means for storing data of the time interval, at which the second transmission means transmits dummy data; first error signal reception means capable of receiving a time-out error signal from the external device: and second control means for, when the time-out error signal is received, controlling the transfer timer storing means to store the time period, during which transmission data is to be accumulated into each data unit, based on the time interval stored in the first transmission time interval storage means.

Accordingly, when a time out error signal is received when dummy data is repeatedly transmitted to the external device experimentally at a certain time interval S, the period of time, during which transmission data should be accumulated into each data unit, can be automatically set as appropriate for the external device based on the time interval S.

In this case, the multi-function peripheral device may further comprise third control means for, when no time-out error signal in received, increasing the time interval to stored in the first transmission time interval storage means and controlling the second transmission means to transmit dummy data to the external device at the increased time interval presently stored in the first transmission time interval storage means. Accordingly, when no time-out error is generated, the time interval, at which dummy data is transmitted, is increased and transmission of dummy data is repeated until a time-out error is generated. It is therefore possible to detect an optimum transmission interval, and accordingly to set an optimum value to the period of time, during which transmission data should be accumulated into each data unit.

Or, the multi-function peripheral device may further comprises third transmission means for repeatedly transmitting dummy data to the external device at a time interval; second transmission time interval storage means for storing data of the time interval, at which the third transmission means transmits dummy data; second error signal reception means capable of receiving a time-out error signal from the external device; and fourth control means for, when no time-out error signal is received, controlling the transfer timer storing means to store the time period, during which transmission data is to be accumulated into each data unit, based on the time interval stored in the second transmission time interval storage means.

Accordingly, then no time out error signal is received in response to the dummy data repeatedly transmitted to the external device experimentally at a certain time interval S', the time period, during which transmission data should be accumulated into each data unit, can be automatically set as appropriate to the external device based on the time interval S'.

In this case, the multi-function peripheral device may further comprise fifth control means for, when a time-out error signal is received, decreasing the time interval stored in the second transmission time interval storage means and controlling the third transmission mans to transmit dummy data to the external device at the decreased time interval presently stored in the second transmission time interval. Accordingly, when a time-out error is generated, the time interval, at which dummy data is transmitted, is decreased and transmission of dummy data is repeated until no time-out error is generated. It is therefore possible to detect an optimum transmission interval, and to set an optimum value to the period of time, during which transmission data is to be accumulated into each data unit.

According to another aspect, the present invention provides a multi-function peripheral device, comprising: a reception portion capable of receiving transmission data serially transmitted from a remote device; a speed identifying unit identifying a reception speed, at which the reception portion receives the transmission data; a changing unit changing, based on the identified reception speed, an amount of the transmission data to be transferred to an external device as a data unit; and a transferring unit transferring, to the external device, the received transmission data by successive data units, each data unit being comprised of the changed amount of the transmission data.

BRIEF DESCRIPTION OF THE DRAWINGS

The above and other objects, features and advantages of the invention will become more apparent from reading the following description of the preferred embodiment taken in connection with the accompanying drawings in which:

FIG. 10 is a flowchart representing a dummy data transmission routine according to a modification of the second embodiment.

DETAILED DESCRIPTION OF THE PREFERRED EMBODIMENT

Figure 1:
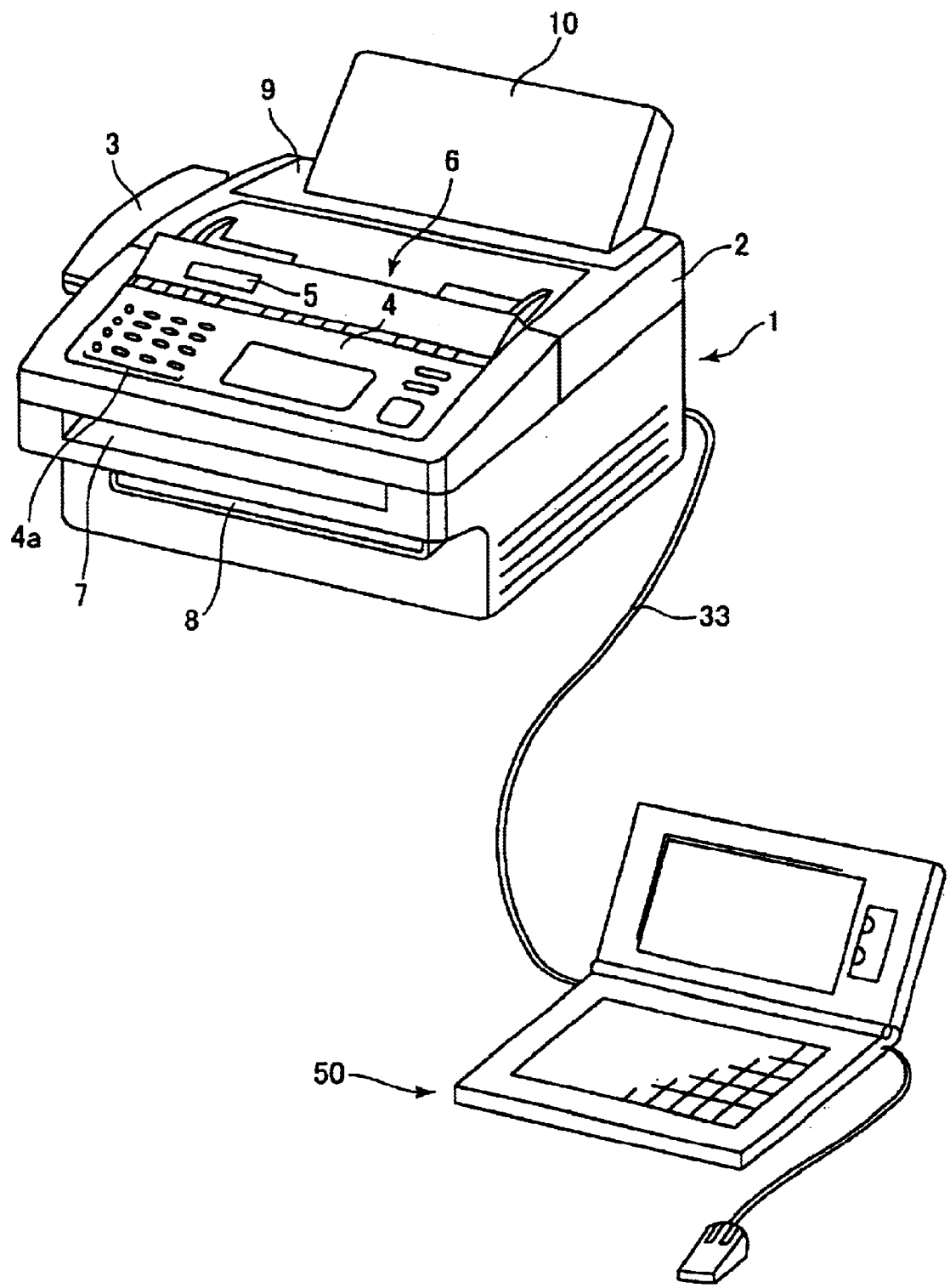
FIG. 1 is an external perspective view of a multi-function device, according to a first embodiment of the present invention, that in connected to a personal computer 50.

A multi-function peripheral device according to preferred embodiments of the present invention will be described while referring to the accompanying drawings wherein like parts and components are designated by the same reference numerals to avoid duplicating description.

<First Embodiment>

First, an explanation for a multi-function device (MFD) 1 according to a first embodiment of the present invention will be described while referring to FIGS. 1–7.

The multi-function device 1 is capable of performing a plurality of functions such as a facsimile function, a copy function, and a modem function.

As shown in FIG. 1, the multi-function device 1 in connected to a personal computer 50. The multi-function device 1 includes a main body 2. Although not shown in the drawings, a hook is provided on the left side of the main body 2. A handset 3, attached to the main body 2 is placed on the hook when no phone call is being performed and is lifted off the hook to make a phone call. An on-hook condition is defined as a state where the handset 3 is placed on the hook. An off-hook condition is defined as another state where the handset 3 is lifted off the hook.

An operation panel 4 is provided on the upper front portion of the main body 2. The operation panel 4 is provided with a plurality of buttons 4a. A liquid crystal display 5 is provided in the left rear portion of the operation panel 4. A user can operate the multi-function device 1 by selectively depressing the plurality of buttons 4a provided on the operation panel 4. The liquid crystal display 5 displays an operation order how the user should operate the operation panel 4 by selectively depressing the buttons 4a. The lied crystal display 5 also displays an operation condition of the multi-function device 1 in response to the user's selective depression of the buttons 4a.

Figure 2:
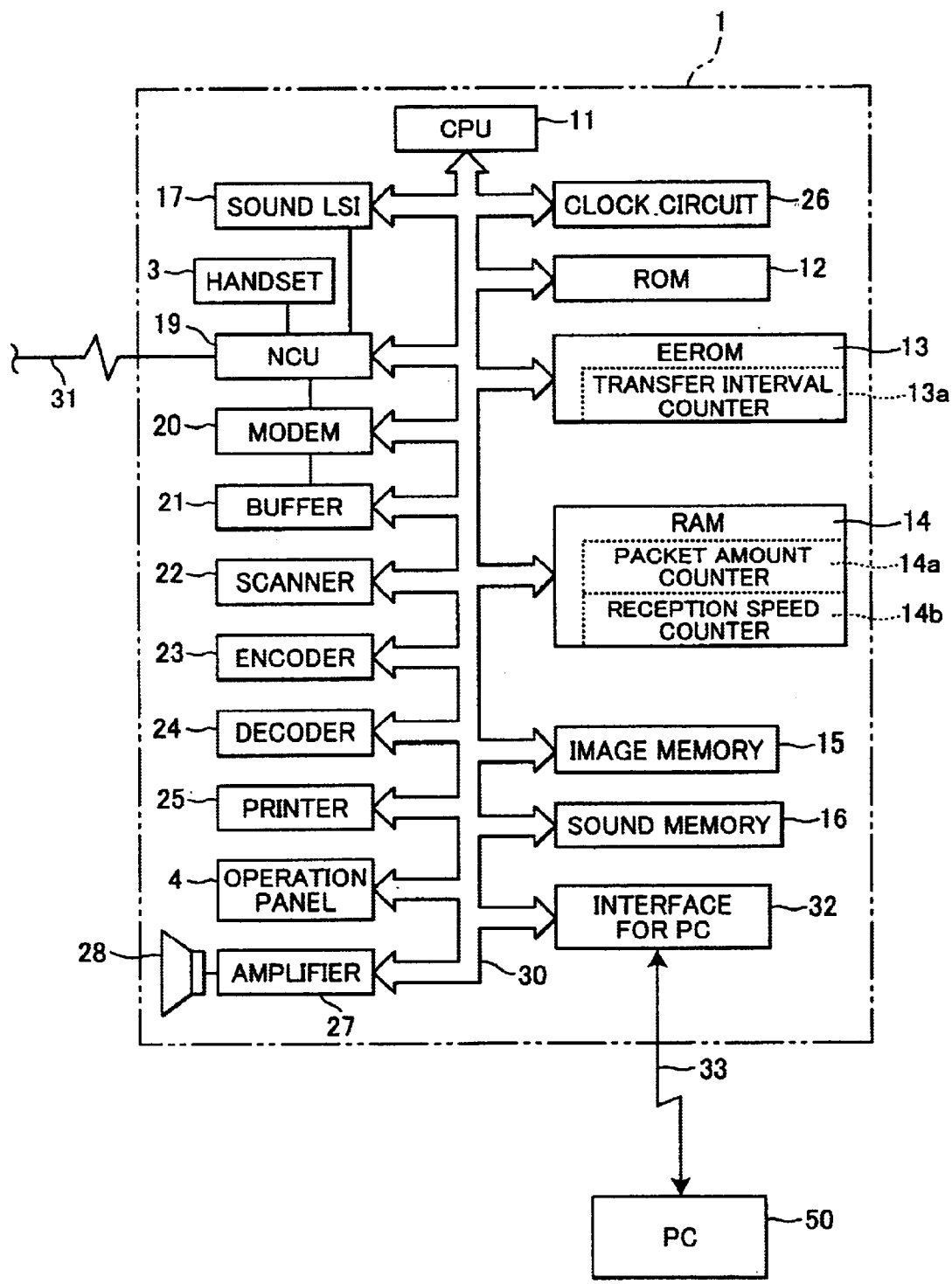
FIG. 2 is a block diagram showing an electrical configuration of the multi-function device of FIG. 1.

A document insertion port 6 is provided bind the operation panel 4 and the liquid crystal display S. Documents to be copied using the copy function or documents to be transmitted to a remote facsimile machine using the facsimile function are inserted face-down through the document insertion port 6. Images formed on the inserted documents are retrieved as image data using a scanner 22 which is provided inside the main body 2 as shown in FIG. 2. Afterwards, the inserted documents are discharged from a document discharge port 7 which in provided below the operation panel 4 in the front surface of the main body 2.

A recording sheet holder mount portion 9 is provided behind the document insertion port 6. A recording sheet holder 10 is detachably mounted on the recording sheet holder mount portion 9. The recording sheet holder 10 is adapted to store a plurality of recording sheets in a stacked condition. Recording sheets are supplied from the recording sheet holder 10 and printed on by a printer 25 which is provided inside the main body 2 as shown in FIG. 2. Such printed-on recording sheets are then discharged from a recording sheet discharge port 8 that is provided below the document discharge port 7.

Although not shown in the drawings, an interface connector is provided to the rear surface of the main body 2. The interface connector is a connection port of an interface 32 (shown in FIG. 2) for being used to be connected with the personal computer 50. In this example, a cable 33, connected at its one and to the personal computer 50, is connected at its other end to the connection port of the interface 32. Thus, the multi-function device 1 is connected to the personal computer 50 via the cable 33. It is noted, however, that the multi-function device 1 and the personal computer 50 need not be connected using the cable 33, but can be connected using an optical signal such as infrared light.

An shown in FIG. 2, the multi-function device 1 includes: a CPU 11, a ROM 12, an electrically-erasable programmable ROM (EEPROM) 13, a RAM 14, an image memory 15, a sound memory 16, a sound LSI 17, a network control unit (NCU) 19, a modem 20, a buffer 21, the scanner 22, an encoder 23, a decoder 24, the printer 25, the operation panel 4, a clock circuit 26, an amplifier 27, and the interface 32 for the personal computer. All these components are connected to one another by a bus line 30.

Figure 3:
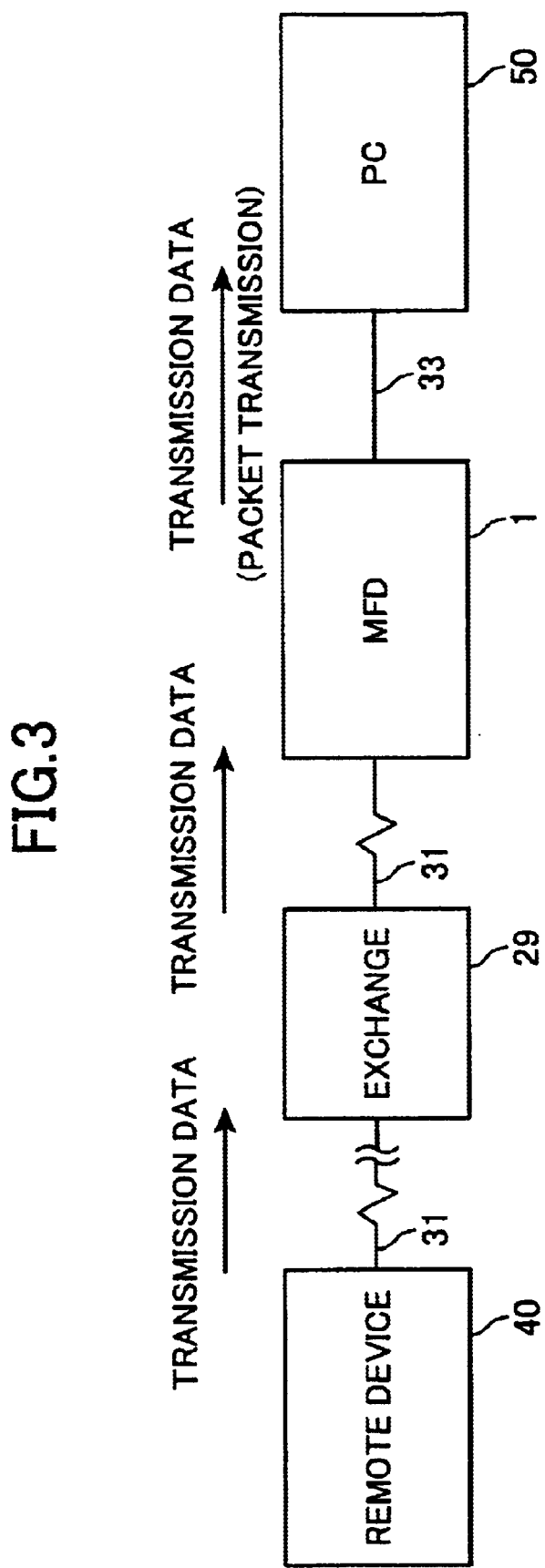
FIG. 3 is a schematic view showing operations of the multi-function device relating to reception and transfer of transmission data.

The multi-function device 1 is connected to a telephone line 31 via the NCU 19. As shown in FIG. 3, the telephone line 31 is connected to an exchange or switchboard 29. Although not shown in the drawing, the exchange 29 is further connected to remote exchanges (switchboards) via the telephone line 31. One of those remote exchanges is connected to a remote device 40, for example, over the telephone line 31. Accordingly, as shown in FIG. 3, the multi-function device 1 can be connected to the remote device 40 via the telephone line 31 and the exchange 29.

It is noted that the connection between the multi-function device 1 and the remote device 40, for example, via the telephone line 31 is of a serial type so that the multi-function device 1 receives transmission data transmitted serially one bit at a time from the remote device 40 over the telephone line 31.

In this example, the multi-function device 1 has a transmission capability of receiving transmission data at a total of six different reception speeds: 2,400 bps (2,400 bits per second), 4,800 bps (4,800 bits per second), 7,200 bps (7,200 bits per second), 9,600 bps (9,600 bits per second), 12,000 bps (12,000 bits per second), and 14,400 bps (14,400 bits per second). As will be described later, the reception speed, at which the remote function device 40 actually transmits transmission data to the multi-function device 1, is determined based on a digital identification signal (DIS) and a digital command signal (DCS) which are transmitted between the multi-function device 1 and the remote device 40 before the multi-function device 1 starts receiving transmission data.

The NCU 19 is for performing network control. More specifically, the NCU 19 receives transmission data transmitted serially one bit at a time from the remote device 40, for example. The NCU 19 also serves to receive ringing signals and telephone numbers such as a telephone number of a calling device (caller) that are transmitted from the exchange 29 (shown in FIG. 3) via the telephone line 31. Also, when the user operates buttons 4a provided on the operation panel 4 to make a telephone call, the NCU 19 transmits a dial signal corresponding to the user's operated buttons 4a to the exchange 29. As shown in FIG. 2, the NCU 19 in connected to the handset 3. The NCU 19 performs transmission and reception of analogue sound signals during a telephone call.

The PC interface 32 in, for example, a parallel interface complying to Centronics standards. Accordingly, the multi-function device 1 is connected in parallel to the personal computer 50 by the cable 33 that is connected to the interface 32. The multi-function device 1 performs transmission and reception of a variety of commands and transmission data to and from the personal computer 50 via the cable 33.

Thus, the multi-function device 1 in connected to the personal computer 50 in parallel via the cable 33, with this structure, the multi-function device 1 can operate to transfer the transmission data, received from the remote device 40, to the personal computer 50 using packet transmission as shown in FIG. 3. The multi-function device 1 transfers the received transmission data to the personal computer 50 using packet transmission according to a predetermined transmission standard "Class 2," in this example. Each packet is comprised of transmission data of a transfer amount whose value is not in a packet amount counter 14a (FIG. 2) as will be described later. As will be described later, the value set in the packet amount counter 14a is equal to a product of the reception speed, at which transmission data in serially received from the remote device 40, and a packet data accumulation time t1 set in a transfer interval counter 13a (FIG. 2) an described later.

In this example, the multi-function device 1 can transfer data using packet transmission at a transfer speed of 60 kilobytes per second. Even compared to the maximum serial reception speed of the multi-function device 1, which is 14,400 bps, the packet transmission transfer speed is 33 times as fast as the serial reception speed. The packet transfer speed of the transmission data is about 200 times faster than the slowest reception speed of the multi-function device 1, which is 2,400 bps. Because the multi-function device 1 thus transfers transmission data to the personal computer 50 using packet transmission, the transmission data can be transferred to the personal computer 50 much faster than the reception speed of the transmission data.

The modem 20 is for modulating image information and transmission data and for transmitting the modulated result to a remote device via the NCU 19. The modem 20 is also for demodulating image information and transmission data received from a remote device via the NCU 19. The modem 20 is further for transmitting and receiving a variety of procedural signals for controlling transmission.

The buffer 21 temporarily stores data, including encoded image information, to be transmitted to or received from the remote device 40. For example, transmission data that has been transmitted one bit at a time in succession from the remote device 40 as shown in FIG. 3 is successively stored into the buffer 21. The transmission data thus stored in the buffer 21 is then successively transferred to the personal computer 50 one packet 60 at a time, each packet being comprised of transmission data of a transfer amount set in the packet amount counter 14a.

The CPU 11 is for controlling all the components connected via the bus line 30, according to a variety of signals transmitted over the NCU 19 and according to programs stored in the ROM 12, to thereby execute data transmission such as facsimile operations and telephone operations.

The clock circuit 26 is for measuring the time. The time measured by the clock circuit 26 is read by the CPU 11 and used for executing the various processes.

The ROM 12 is an unrewritable memory that stores control programs to be executed by the CPU 11 of the multi-function device 1. For example, the ROM 12 stores programs represented by the flowcharts of FIGS. 6 and 7.

The EEPROM 13 in a rewritable non-volatile memory. Data stored in the EEPROM 13 in therefore maintained even after the power source of the multi-function device 1 has been turned off. As shown in FIG. 2, the EEPROM 13 includes the transfer interval counter 13a. The transfer interval counter 13a in for storing a value of the packet data accumulation time t1. The packet date accumulation time t1 is defined as one parameter for determining the size, of a single packet 60 (FIG. 5), to be set in the packet amount counter 14a. The packet data accumulation time t1 is defined as a period of time, during which transmission data should be received to be accumulated into each packet 60.

As described above, the multi-function device 1 is designed to transfer transmission data, that is transmitted serially one bit at a time from a remote device 40, to the personal computer 50 as successive packets 60, each packet 60 having transmission data of a transfer amount whose value is set in the packet amount counter 14a. Thus, the multi-function device 1 can transfer transmission data with high transfer efficiency.

When the multi-function device 1 thus transfers transmission data to the personal computer 50, the personal computer 50 receives and processes the transmission data through executing a predetermined communication software installed therein. For example, the personal computer 50 displays the transmission data on a display of the personal computer 50. The personal computer 50 generates a time-out error when the personal computer 50 receives no transmission data for a predetermined duration of time or longer. The personal computer 50 then outputs an error signal (time-out error signal) to the multi-function device 1 and terminates reception processes. Once a time-out error signal is received, the multi-function device 1 can no longer transfer transmission data to the personal computer 50.

Considering the above, according to the present embodiment, the packet data accumulation time t1 is determined and set in the transfer interval counter 13a so that the personal computer 50 will not generate time-out errors during transfer of transmission data. More specifically, the multi-function device 1 determines and sets the value t1 in the transfer interval counter 13a by executing a dummy data transmission routine of FIG. 6 in a manner described below.

The multi-function device 1 first transmits dummy data to the personal computer 50 to test for conditions that generate any time-out error. That is, after transmitting dummy data to the personal computer 50, the multi-function device 1 measures time until an error signal indicating a time-out error is received. Based on the test results, the multi-function device 1 calculates, as a time-out time, a period of time from when dummy data is transmitted to the personal computer 50 until the error signal indicating the time-out error is received. It is noted that the period of time until an error signal is received differs according to the communication software executed by the personal computer 50, but is normally about five seconds. The multi-function device 1 then determines the value t1 of the transfer interval counter 13a based on the thus calculated time-out time. For example, the multi-function device 1 determines the value t1 of the transfer interval counter 13a as a value obtained by subtracting one second from the time-out time.

The RAM 14 is a memory for temporarily storing a variety of data during execution of a variety of operations in the multi-function device 1. The RAM 14 includes the packet amount counter 14a and a reception speed counter 14b.

The reception speed counter 14b is a counter for storing the reception speed of transmission data transmitted serially from the remote device 40. The reception speed 18 determined and set in the reception speed counter 14a during a first stage of a transform routine of FIG. 7 that is executed by the multi-function device 1 for actually transferring, to the computer 50, transmission data received from the remote device 40.

That is, as described already, the multi-function device 1 determines the reception speed based on a digital identification signal (DIS) and a digital command signal (DCS) transmitted between the multi-function device 1 and the remote device 40 before the actual transmission of transmission data is started. The value of the thus determined reception speed is stored in the reception speed counter 14b.

The packet amount counter 14a is a counter for storing the size of a single packet 60, that is, a transfer amount of transmission data to be transferred in a single packet from the multi-function device 1 to the personal computer 50. The size of the single packet 60 is determined and set in the packet amount counter 14a also during the first stage of the transfer routine of FIG. 7 in a manner described below.

Figure 6:
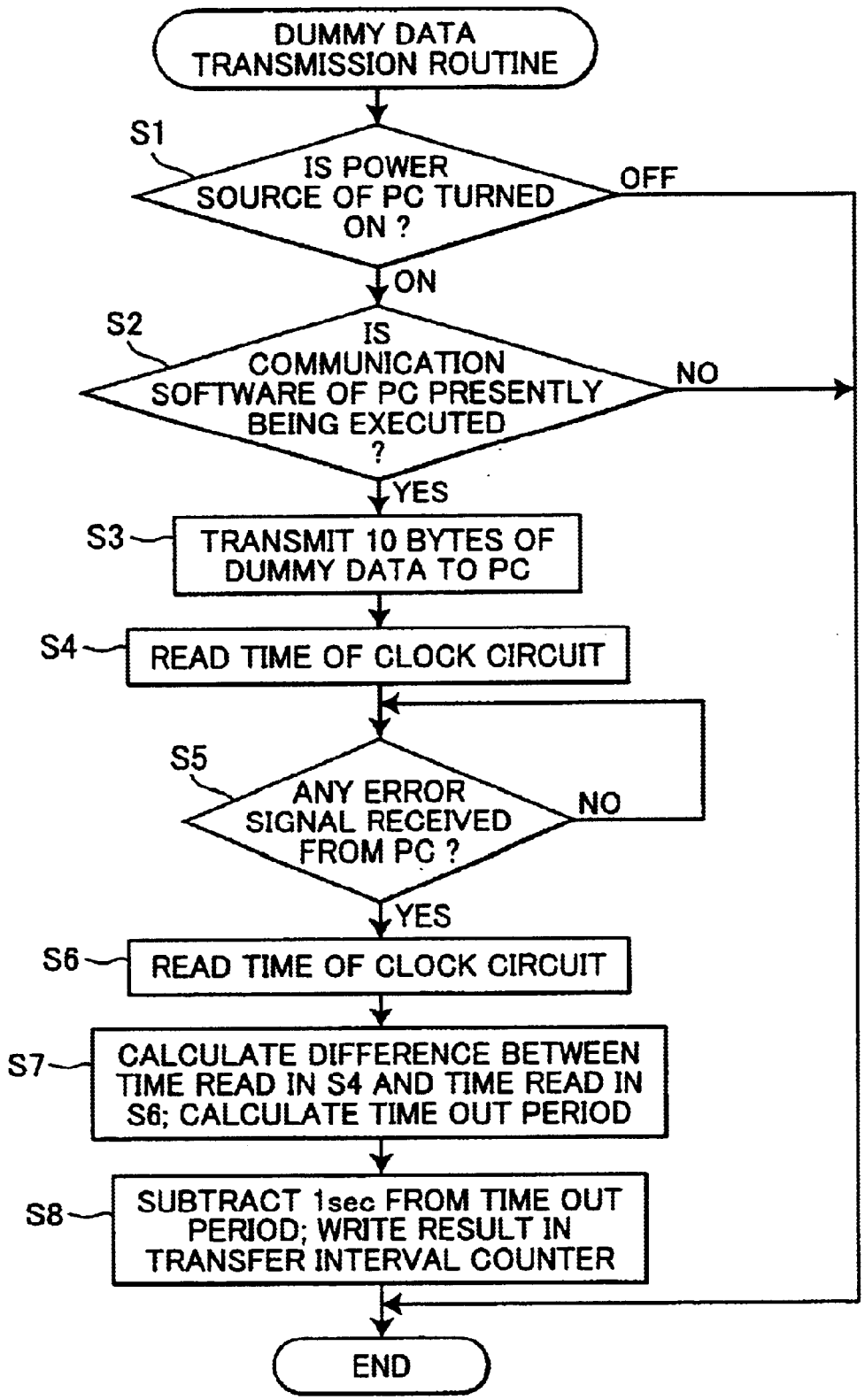
FIG. 6 is a flowchart representing a dummy date transmission routine.
Figure 7:
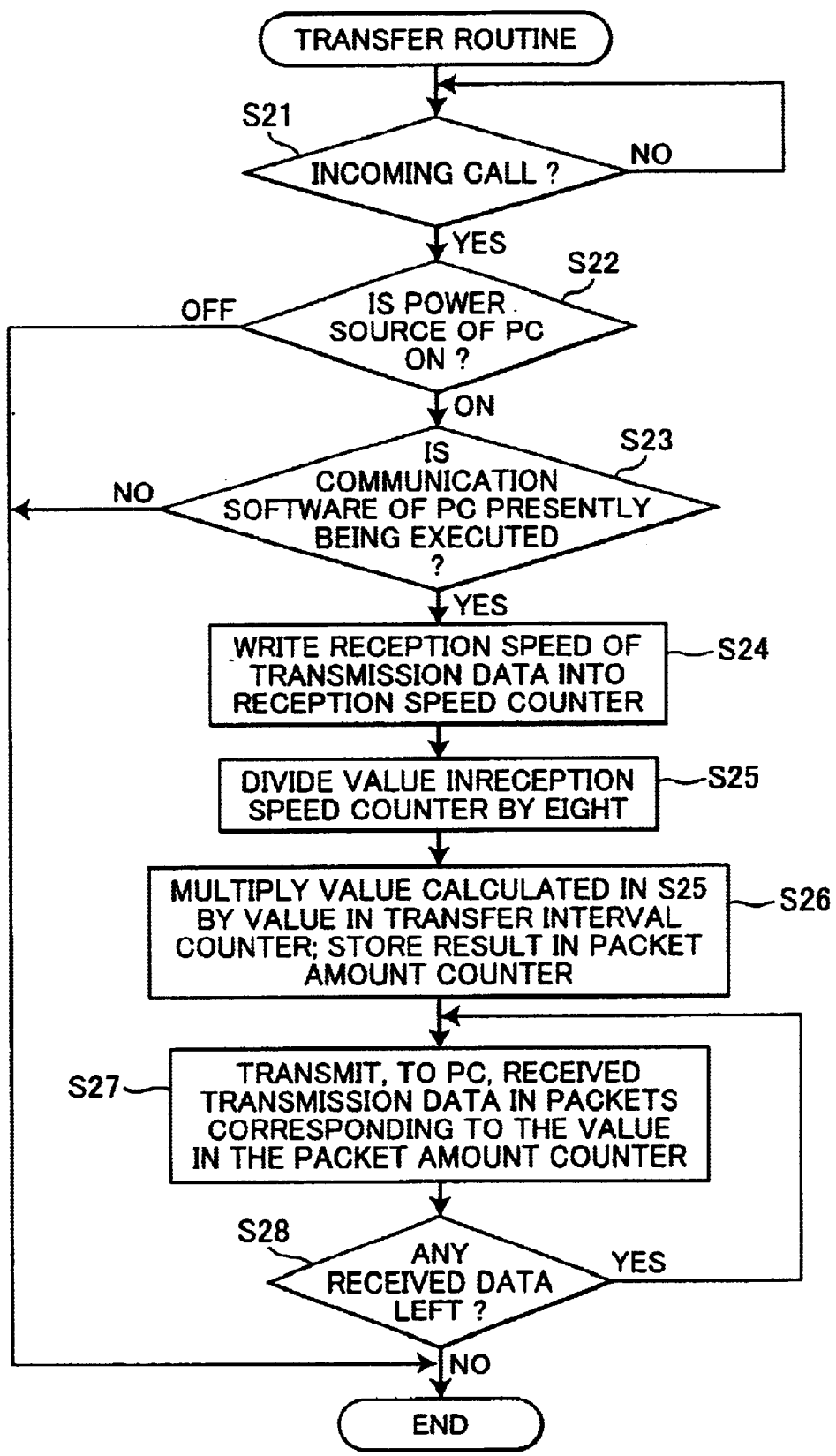
FIG. 7 is a flowchart representing a transfer routine.

As described already, during the transfer routine of FIG. 7, the reception speed, at which the multi-function device 1 receives transmission data from a remote device 40, is first determined and set in the reception speed counter 14b. It is noted that the reception speed is represented in terms of bits of transmission data transmitted from the remote device 40 each second. Therefore, the value of the reception speed in terms of bits is converted into a value of the reception speed in terms of bytes. That is, the value of the reception speed represented in terms of "bits per second" is converted into another value of the reception speed represented in terms of "bytes per second". Then, the value of the reception speed thus represented in terms of "bytes per second" is multiplied by the value of the packet data accumulation time t1 that is determined during the dummy data transmission routine of FIG. 6 and that is stored in the transfer interval counter 13a. The thus calculated product of: the amount (in bytes) of transmission data transmitted each second from the remote device 40 to the as multi-function device 1; and the value of the packet data accumulation time t1 of the transfer interval counter 13a, is stored in the packet amount counter 14a as the size of a single packet 60 to be transferred to the personal computer 50.

Thus, the size of the packet 60 is set equal to the product of: the reception speed of transmission data (bytes per second), at which the multi-function device 1 receives transmission data serially from the remote device 40; and the value of the packet data accumulation time t1 stored in the transfer interval counter 13a. Accordingly, when the reception speed of transmission data is high, the size of the packet 60 will be determined to a large value. When the reception speed of transmission data is slow, the size of the packet 60 will be determined to a small value.

It is noted that the reception speed, at which transmission data is transmitted serially from a remote device, is fixed and cannot be changed during a single transmission process. Accordingly, the period of time required until the multi-function device 1 can receive transmission data of an amount set in the packet amount counter 14a will be fixed, during the subject transmission process, as equal to the value t1 of the transfer interval counter 13a. Accordingly, the multi-function device 1 can continuously transfer successive packets to the personal computer 50 at a time interval equal to the value t1. Time-out errors at the personal computer 50 can be prevented because the value t1 has been set, during the dummy data transmission routine of FIG. 6, within a range wherein time-out errors would not be generated.

The image memory 15 is a memory for storing a transmission record, image data, and bit images for printing. The image memory 15 is configured from an inexpensive, large capacity dynamic RAM (DRAM). The received image data is stored temporarily in the image memory 15. After the printer 25 prints on a recording sheet based on the image data, the image data is deleted from the image memory 15. Although image data requires a great deal of free memory for storage, because the image data is always deleted after printing of the image date has been completed, the image memory 15 can be effectively used.

The sound memory 16 is a memory for storing a response voice message to be transmitted to caller side devices and for storing incoming voice messages transmitted from the caller side devices. The sound memory 16 is configured also from an inexpensive, large capacity dynamic RAM (DRAM) similarly to the image memory 15. Incoming messages stored in the sound memory 16 are deleted when the user appropriately manipulates the operation panel 4 or when a deletion command is received from a remote device that is connected to the multi-function device 1 via the telephone line 31.

The sound LSI 17 performs voice recognition processes and voice synthesizing processes. In the voice recognition processes, analogue voice signals received over the NCU 19 are converted into digital voice signals. In the voice synthesizing processes, digital voice signals generated internally by the multi-function device 1 are converted into analogue voice signals and outputted to the NCU 19 or the speaker 28 via the amplifier 27.

The scanner 22 is for retrieving, as image data, images of a document inserted in the document insertion port 6. The encoding portion 23 is for encoding image data retrieved by the scanner 22. The decoding portion 24 is for retrieving image data stored in the image memory 15 or the buffer 21 and for decoding the retrieved image data. The printer 25 prints the decoded data on a recording sheet.

The operation panel 4 is for being operated by the user to perform a variety of operations such as designating the settings of the multi-function device 1.

The amplifier 27 sounds the speaker 28 connected to the amplifier 27 to output ringing sounds and reproducing voices.

Figure 4:
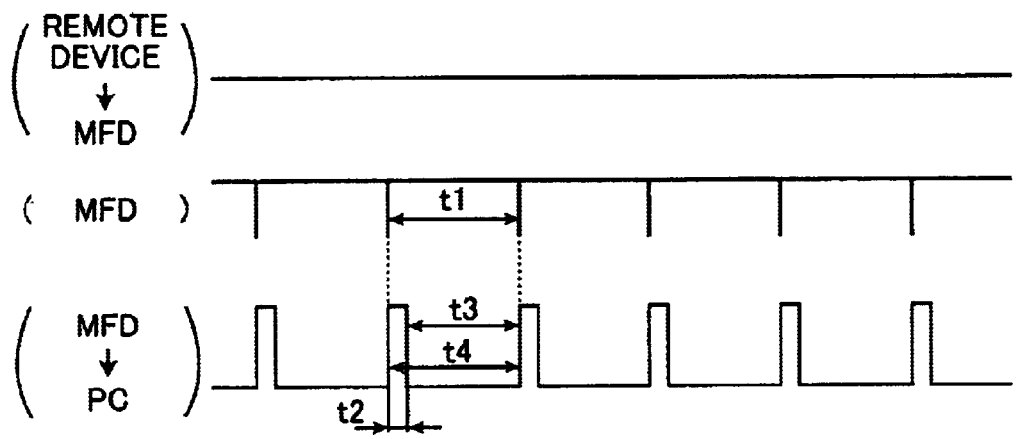
FIG. 4 is a timing chart showing timing of reception and transfer of transmission data.

With the above-described structure, the multi-function device 1 transfers transmission data, received from the remote device 40, to the personal computer 50 at timings illustrated in FIG. 4.

That is, the remote device 40 transmits the transmission data serially one bit at a time. The multi-function device 1 receives the transmission data and temporarily stores it in the buffer 21. Once data of an amount, set in the packet amount counter 14a, accumulates in the buffer 21, the multi-function device 1 appends a three byte header portion 61 shown in FIG. 5 to the accumulated transmission data to form a single packet 60. The multi-function device 1 then transfers the packet 60 to the personal computer 50. It is noted that the time until when data of the amount, set in the packet amount counter 14a is received from the remote device 40 matches the value of the packet data accumulation time t1 of the transfer interval counter 13a because the amount of the packet amount counter 14a is set as equal to a product of the value t1 and the reception speed, at which data is received from the remote device 40.

The packet data accumulation time t1, which represents the period of time required to receive transmission data of an amount set in the packet amount counter 14a, is equivalent to an inter-start time t4 defined from the start of a certain transmission data transfer to the start of a subsequent transmission data transfer. The inter-start time t4 is the sum of a transfer time t2 required for transfer and a waiting time t3 which is a waiting time from the end of the certain data transfer to the start of the subsequent data transfer.

When the reception speed of transmission data is set to 14,400 bps, the packet transfer speed is approximately 33 times as fast as the reception speed. Accordingly, the transfer time t2 required to transfer the packet 60 is approximately 1/33 times the packet data accumulation time t1. Because the packet data accumulation time t1 is equal to the inter-start time t4, the transfer time t2 is approximately 1/33 the inter-start time t4. Because the transfer time t2 is only a small duration of time compared to the inter-start time t4, the inter-start time t4 can be considered substantially equal to the waiting time t3 that is obtained by subtracting the transfer time t2 from the inter-start time t4. Because the packet data accumulation time t1 is equal to the inter-start time t4, then the packet data accumulation time t1 can be considered substantially equal to the waiting time t3. Accordingly, by setting the packet data accumulation time t1 within a range wherein time-out errors are not generated at the personal computer 50, the transfer time interval t3 can also be set to a range wherein time-out errors are not generated.

In this way, the multi-function device 1 transfers a packet 60, comprised of transmission data of an amount set in the packet amount counter 14a, to the personal computer 50, with the transfer time t2 required to transfer the packet 60 being about ⅓₃ the packet data accumulation time t1 required to receive the corresponding amount of transmission data from the remote device 40. The cable 33 will not therefore be exclusively used for transferring transmission data. Accordingly, while the multi-function device 1 transfers the transmission data to the personal computer 50, the multi-function device 1 and the personal computer 50 can also transmit and receive a variety of data and commands, other than the transmission data, to and from each other. Transfer of transmission data will not be interfered with by transmission and reception of such commands and data.

Figure 5:
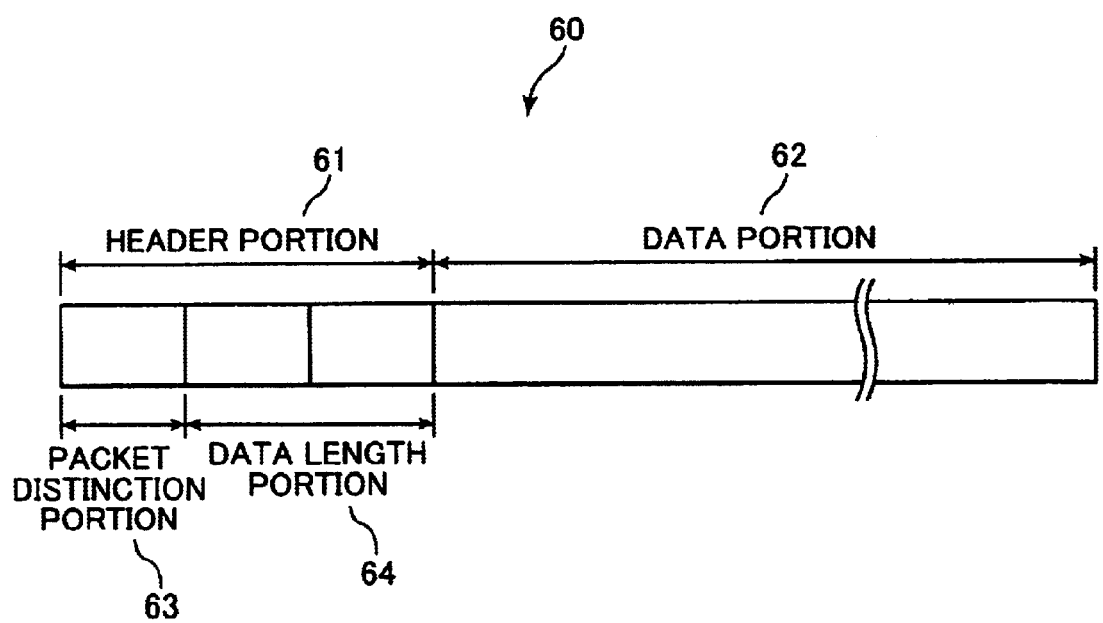
FIG. 5 is a schematic view showing configuration of data in each packet.

As shown in FIG. 5, the packet 60, which is a data group transmitted using packet transmission, is configured from a data portion 62 and a header portion 61 which includes a packet distinction portion 63 and a data length portion 64. The data portion 62 is comprised of the transmission date received from the remote device 40 and accumulated into the amount set in the packet amount counter 14a. The header portion 61 is constructed from three bytes in total. More specifically, the packet distinction portion 63 is formed from a single byte, and the data length portion 64 is formed from two bytes.

The packet distinction portion 63 indicates that data following the packet distinction portion 63 is packet data. The packet distinction portion 63 designates a standard, according to which data in the packet 61 is defined, and addresses where data in the packet 60 is to be allocated. In this example, the packet distinction portion 63 stores "40H" indicative of the standard "Class2", according to which data of the packet 60 should be transferred to the communication software of the personal computer 50. Data of the data length portion 64 indicates the size of the data portion 62 in the packet 60. Accordingly, the actual size of the entire packet 60 is equal to a sun of the size, indicated by the data length portion 64, and three bytes of the header portion 61.

Next, an explanation will be provided for operations of the multi-function device 1 while referring to the flowcharts shown in FIGS. 6 and 7.

The multi-function device 1 executes a dummy data transmission routine shown in FIG. 6. The dummy data transmission routine is a routine for determining the packet data accumulation time t1, during which transmission data should be received to be accumulated into a single packet 60. The determined packet data accumulation time t1 is stored in the transfer interval counter 13a.

The multi-function device 1 executes the dummy data transmission routine when the operator manually operates the operation panel 4 to start the dummy data transmission routine.

Or, the multi-function device 1 may execute the dummy data transmission routine when the operator manually operates the personal computer 50, that is presently executing the communication software, to start the dummy data transmission routine. In this case, in response to the operator's manual operation, the personal computer 50 transmits, to the multi-function device 1, a control command for instructing start of the dummy data transmission routine.

Or, the multi-function device 1 may automatically execute the dummy data transmission routine when the personal computer 50 starts executing the communication software. In this case, when starting the communication software, the personal computer 50 transmits, to the multi-function device 1, a control command for instructing start of the dummy data transmission routine while performing initialization settings between the computer 50 and the multi-function device 1.

As shown in FIG. 6, during the dummy data transmission routine, first, the CPU 11 in the multi-function device 1 judges whether or not the power source of the personal computer 50 in being ON or not by checking the high/low status of a select in (SELIN) signal from the personal computer 50. When the SELIN signal is high, the CPU 11 determines that the power source of the personal computer 50 is off. When the SELIN signal to low, the CPU 11 determines that the power source of the personal computer 50 is on.

When the CPU 11 judges that the power source of the personal computer 50 is off (S1:OFF), then the CPU 11 determines that dummy data cannot be transmitted to the computer 50, so terminates the dummy data transmission routine.

On the other hand, when the power source of the personal computer 50 is on (S1:ON), then the CPU 11 determines in S2 whether or not the communication software, that the personal computer 50 uses to receive transmission data transferred from the multi-function device 1, is running or not. The CPU 11 determines whether the communication software is running by transmitting a predetermined command to the personal computer 50. When the personal computer 50 responds to the command, then the CPU 11 judges that the communication software is presently running. On the other hand, when the personal computer 50 does not respond to the command, then the CPU 11 judges that the communication software is not running.

When the multi-function device 1 determines that the communication software in not running, (S2:NO), then the CPU 11 determines that dummy data cannot be transmitted to the computer 50, so the CPU 11 terminates the dummy data transmission routine.

On the other hand, when the communication software to being executed (S2:YES), then in S3 the multi-function device 1 transmits ten bytes of dummy data to the personal computer 50. After transmitting the dummy data, in S4 the CPU 11 reads the time presently indicated by the clock circuit 26. Then in S5 the multi-function device 1 waits to receive, from the personal computer 50, an error signal indicating a time-out error. Once an error signal is received from the personal computer 50 (S5:YES), then in S6, the CPU 11 reads, from the clock circuit 26, data of the time when the error signal is received. Then in S7, the CPU 11 calculates the difference between the time read in S4 and the time read in S6 to calculate a time-out period. Although the period of time (time-out period) defined from when data is transmitted and till a time-out error is received varies depending on the particular communication software running on the personal computer 50, normally the time-out period is about five seconds.

After calculating the time-out period, in S8, the CPU 11 performs a calculation to subtract one second from the time-out period. The CPU 11 writes the resultant value in the transfer interval counter 13a as the packet data accumulation time t1, i.e., a period of time during which transmission data should be received and accumulated into a single packet 60. It is noted that one second is subtracted from the time-out period in S8 in order to ensure that time-out errors will not be generated while transmission data is actually being transferred to the personal computer 50. After the packet data accumulation time t1 is thus written in the transfer interval counter 13 in S8, the dummy data transmission routine is ended.

Thus, the multi-function device 1 executes the dummy data transmission routine, before executing actual transfer of transmission data, in order to experimentally cause the personal computer 50 to generate a time-out error by transmitting the data to the personal computer 50. The multifunction device 1 then calculates the time-out period elapsing from when dummy data is transmitted to the personal computer 50 until a time-out error signal is received, and calculates the packet data accumulation time t1 based on the time-out period.

The multi-function device 1 continuously executes a transfer routine of FIG. 7 while the power of the multi-function device 1 is being ON. The transfer routine is for setting a transfer amount of transmission data to be transferred in a single packet 60 to the personal computer 50 and then for actually transferring successive packets of the transmission data, each packet being comprised of transmission data of the set amount, to the personal computer 50. It is noted that during the transfer routine, the multi-function device 1 determines the transfer amount for a single packet 60 based on the reception speed of the transmission data and on the packet data accumulation time t1 determined during the dummy data transmission routine of FIG. 6.

During the transfer routine, the CPU 11 first waits for an incoming call from remote devices. Once an incoming call is received from a remote device (remote device 40, in this example) (S21;YES), then the program proceeds to S22.

In S22, the CPU 11 judges whether or not the power source of the personal computer 50 is ON in the same manner as in S1 (FIG. 6). When the power source of the personal computer 50 in off, (S22;OFF), then the CPU 11 determines that transmission data cannot be transferred to the personal computer 50. Accordingly, the transfer routine is ended. It is noted that if some transmission data has been received up to that time, the CPU 11 deletes the transmission data before terminating the transfer routine.

On the other hand, when the power source of the personal computer 50 in on, (S22;ON), then in S23, the CPU 11 further judges whether or not the communication software of the personal computer 50 to operating in the same manner as in S2 (FIG. 6). If the communication software is not running (S23;NO), then the CPU 11 determines that transmission data cannot be transferred to the personal computer 50. Accordingly, the transfer routine is ended. It is noted that if some transmission data has been received up to that time, the CPU 11 deletes the transmission data before terminating the transfer routine.

When the communication software is running on the personal computer 50 (S23;YES), then the program proceeds to S24. In S24, the CPU 11 first transmits a DIS signal to the remote device 40 in order to indicate its transmission parameters (resolution, encoding format, and reception speed). In this example, the DIS signal indicates that the multi-function device 1 can receive data at 14,400 bps at maximum. Receiving the DIS signal, the remote device 40 determines its own transmission parameters (resolution, encoding format, and transmission speed). More specifically, the remote device 40 compares the maximum reception speed, at which the multi-function device 1 can receive transmission data, with the maximum transmission speed, at which the device 40 can transmit transmission data. The remote device 40 then sets its transmission speed to the slower one of the compared two speed values. Then, the remote device 40 transmits a DCS signal to the multi-function device 1 to indicate its newly-set transmission parameters including the determined transmission speed. For example, if the remote device 40 can transmit data at 14,400 bps, the DCS signal indicates that the remote device 40 will transmit data at 14,400 bps. If the remote device 40 can transmit data at 9,600 bps, the DCS signal indicates that the remote device 40 will transmit data at 9,600 bps. Receiving the DCS signal, the CPU 11 sets its reception speed equal to the transmission speed. For example, if the DCS signal indicates that the remote device 40 will transmit data at 14,400 bps, the CPU 11 sets its reception speed to 14,400 bps. If the DCS signal indicates that the remote device 40 will transmit data at 9,600 bps, the CPU 11 sets its reception speed to 9,600 bps. At the thus determined speed, the remote device 40 will transmit transmission data to the multi-function device 1, and the multi-function device 1 will receive the transmission data.

In S24, the CPU 11 further writes, into the reception speed counter 14b, the determined reception speed, at which the transmission data will be received serially from the remote device 40. That is, the CPU 11 stores, in the reception speed counter 14b, the reception speed that is determined an described above based on the DCS signal transmitted from the remote device 40.

Then, the program proceeds to S25. Because the value of the reception speed is indicated in terms of numbers of bits received per second (bps), the CPU 11 performs, in S25, a calculation to divide the value of the reception speed counter 14b by eight (8) to convert the reception speed value into a byte value. After dividing the value in the reception speed counter 14b by eight (8), in S26, the CPU 11 further performs a calculation to multiply the resultant value [bytes per second] by the value t1 in the transfer interval counter 13a, and stores the product in the packet amount counter 14a. Then in S27, the CPU 11 transmits, as a packet, transmission data received and accumulated into the amount equal to the value of the packet amount counter 14a to the personal computer 50. Thus, the CPU 11 transmits, to the personal computer 50, the transmission data in a packet 60 corresponding to the value in the packet amount counter 14a.

It is now assumed that the reception speed of the transmission data is 14,400 bps and that the packet data accumulation time t1 has been net to two seconds during the dummy data transmission routine. In this case, the reception speed of 14,400 bits per second is divided by eight (8), resulting 1,800 bytes per second. The value of 1,800 bytes per second is then multiplied by the packet data accumulation time t1 of two seconds, resulting in 3,600 bytes of transmission data per packet. The three bytes of the header portion 61 (packet distinction portion 63 and data length portion 64) are then appended to the value of 3,600 bytes of transmission data to form a single packet 60. Accordingly, in this case, the single packet 60 will be transferred to the personal computer 50 in groups of 3,603 bytes.

In the same way, when the reception speed is 2,400 bps, each single packet 60 will be transferred to the personal computer 50 in groups of 303 bytes.

After the packet 60 is transferred, the CPU 11 determines in S28 whether or not any transmission data remain untransferred. If so (S28:YES), then the program returns to S27 and the processes of S27 and S28 are repeated. Once all the transmission data has been transferred (S28:NO), then the transmission routine is ended.

Thus, according to the present embodiment, when the power source of the personal computer 50 is on (S22:ON) and when the communication software of the personal computer 50 is running (S23:YES), then the reception speed of transmission data serially transmitted from the remote device 40 is written in the reception speed counter 14b in S24. The size of a single packet 60 of transmission data, to be transferred to the personal computer 50, is changed based on the value stored in the reception speed counter 14b.

Accordingly, for any value of the reception speed, a transfer interval can be maintained in a fixed value so that the communication software in the personal computer 50 will generate no time out error signal.

More specifically, the size of a single packet 60 to be transmitted during the transmission routine is set based both on the reception speed of transmission data and on the packet data accumulation time t1 that in determined during the dummy data transmission routine of FIG. 6. The packet data accumulation time t1 to defined as a period of time, during which transmission data should be received and accumulated into a packet while not bringing the computer 50 into the time-out error state. The multi-function device 1 transfers successive packets 60 to the personal computer 50 at an interval of the packet data actuation time t1. Accordingly, transmission data received from the remote device 40 can be transferred to the personal computer 50 without any time-out errors being generated.

Especially, during the process of S8 in the dummy data transmission routine, the packet data accumulation time t1 is set to a value as long as possible within a range wherein the communication software of the personal computer 50 will not generate time-out errors. Therefore, an amount of data in each packet 60 can be set an large as possible so that transfer operations can be performed effectively.

The amount of data in each packet 60 changes according to the reception speed. Accordingly, the transfer time t3 can be a fixed value for any reception speed of transmission data.

<Second Embodiment>

Next, a multi-function device 100 according to a second embodiment of the present invention will be described while referring to FIGS. 8 and 9.

The multi-function device 100 is the same as the multi-function device 1 of the first embodiment except for points described below.

Figure 8:
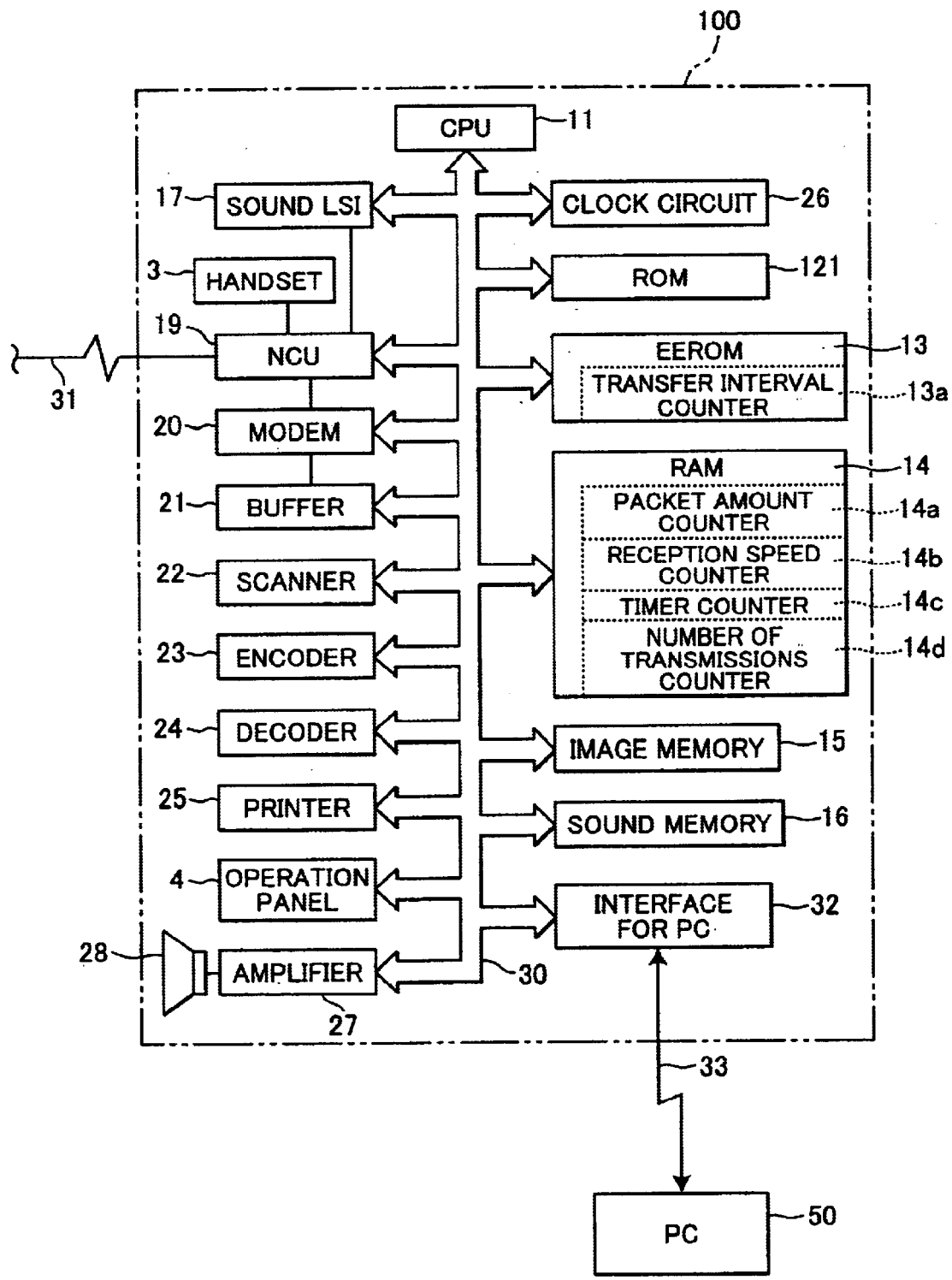
FIG. 8 is a block diagram showing electrical configuration of a multi-function device, according to a second embodiment, which is connected to a personal computer.

As shown in FIG. 8, in the multi-function device 100, a ROM 121 is provided instead of the ROM 12. The ROM 121 is an unrewritable non-volatile memory and stores control programs according to the second embodiment. For example, the ROM 121 stores therein the program of the transfer routine shown in FIG. 7 and a program of a dummy data transmission routine shown in FIG. 9.

In addition to the packet amount counter 14a and the reception speed counter 14b, the RAM 14 further includes a timer counter 14c and a number of transmissions counter 14d. Both of the timer counter 14c and the number of transmissions counter 14d are used during the dummy data transmission routine of FIG. 9.

The timer counter 14c is a counter for storing a transmission interval from when transmission of a certain set of dummy data is completed to when transmission of a subsequent set of dummy data is started during experimental transmission of dummy data from the multi-function device 100 to the personal computer 50. Thus, during the dummy data transmission routine of FIG. 9 to be described later, dummy data is transmitted from the multi-function device 100 to the personal computer 50 at a transmission interval indicated by the value in the timer counter 14c. The initial value of the counter 14c is set to one second.

The number of transmission counter 14d is a counter for storing the number of times dummy data is to be experimentally transmitted from the multi-function device 100 to the personal computer 50 at a time interval stored in the timer counter 14c. During the dummy date transmission routine of FIG. 9, therefore, dummy data in experimentally transmitted from the multi-function device 1 to the personal computer 50 at a timing indicated by the time counter 14c for the number of times indicated by the value in the number of transmissions counter 14d. The initial value of the counter 14d is set to five times.

Figure 9:
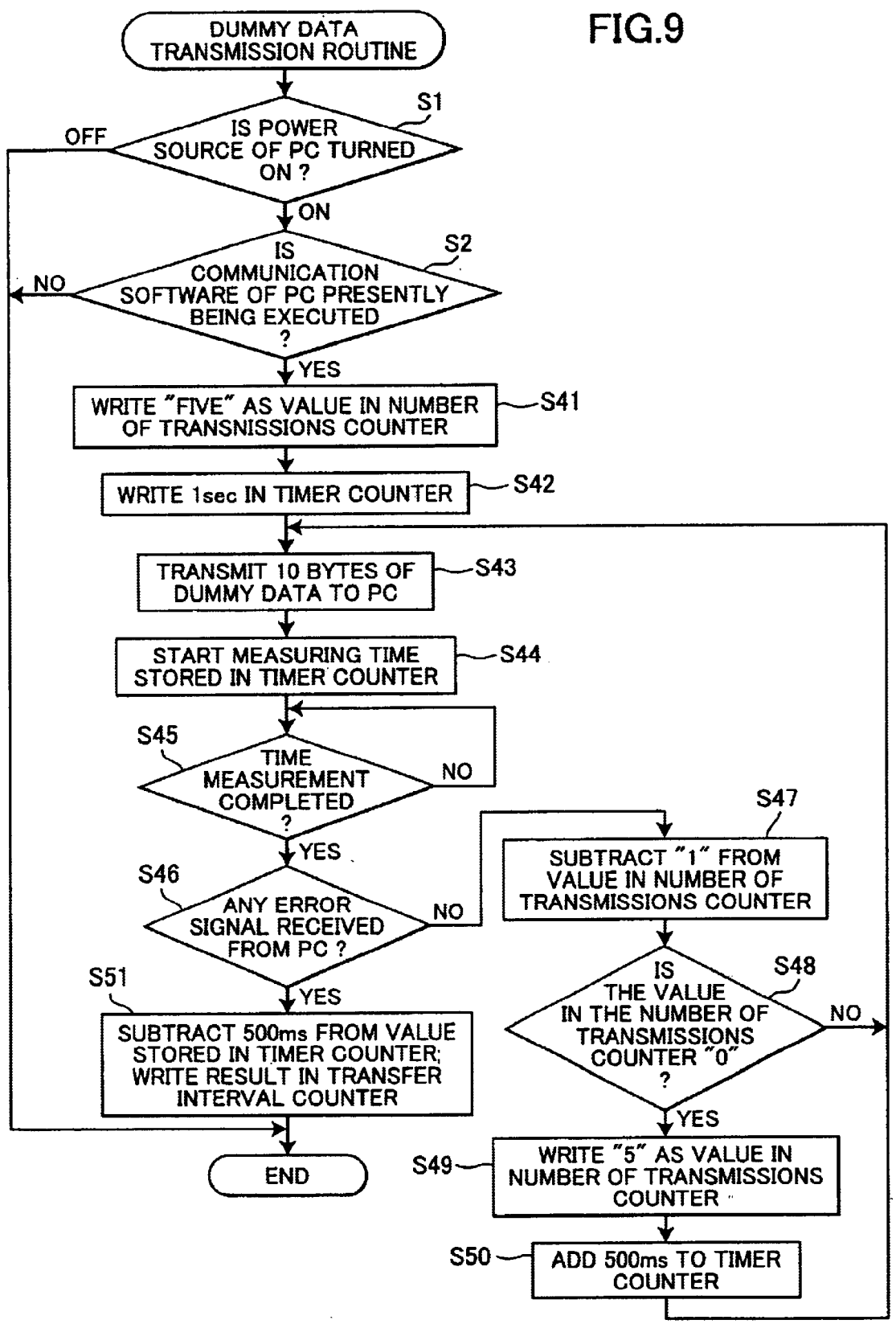
FIG. 9 is a flowchart representing a dummy data transmission routine according to the second embodiment.

During the dummy data transmission routine of FIG. 9, when the personal computer 50 does not generate a time-out error signal while dummy data is being transmitted at the number of times indicated by the value in the number of transmissions counter 14d, then the value in the timer counter 140 is added with 500 ms. Then, dummy data is again transmitted by the number of times indicated by the value in the number of transmissions counter 14d at a transmission interval newly set in the timer counter 14c, on the other hand, if a time-out error signal is received, then transmission of dummy data is stopped without transmitting the dummy data the number of times in the number indicated by the number of transmissions counter 14d. A value of 500 is subtracted from the value presently set in the timer counter 14c, and the resulting value is set as the packet data accumulation time t1. Because dummy data in thus transmitted a plurality of times at the time interval set in the timer counter 14a, the time interval which generates a time-out error signal can be reliably determined.

It is now assumed that the time counter 14c is set to one second and the number of transmission counter 14d is set to five. Because the value in the timer counter 14c is one second, dummy data is transmitted to the personal computer 50 each time a one second long interval elapses. Because the value in the number of transmission counter 14d is five, the dummy data is repeatedly transmitted to the personal computer 50 five times at the same time interval of one second. In this case, when the personal computer 50 does not generate a time-out error signal while dummy data is transmitted five times at the time interval of one second, the multi-function device 1 will add a value of 500 ms to the value in the timer counter 14c, and again transmits five times dummy data to the personal computer 50 at the increased time interval (1.5 seconds, in this example). In other words, unless a time-out error signal is received from the personal computer 50, the multi-function device 1 increases the value in the timer counter 14c by a 500 ms unit and repeatedly transmits dummy data to the personal computer 50. When the time-out error signal in received, then, the multi-function device 100 subtracts the value of 500 ms from the value presently not in the timer counter 14c, and determines the resulting value as the packet data accumulation time t1.

The dummy data transmission routine of FIG. 9 according to the second embodiment is the same as that of FIG. 6 according to the first embodiment except that processes of S41–S51 are executed in place of the processes of S3–S8. In other words, the dummy data transmission routine of the second embodiment differs from the first embodiment by the method of transmitting dummy data and the method of determining the packet data accumulation time t1.

As shown in FIG. 9, when the power source of the personal computer 50 is on (S1:YES) and the communication software of the personal computer in running (S2:YES), then in S41, the CPU 11 writes the value "5" in the number of transmissions counter 14d to indicate that dummy data should be transmitted five times to the personal computer 50. Next in S42, the CPU 11 writes the initial value of "1" in the timer counter 14c. The process of S42 sets an initial value of one second to a transfer interval, that is, a period of time from when transmission of a certain set of dummy data is completed to when transmission of a subsequent set of dummy data is to be started.

After the initial value of "1" is written in the timer counter 14c, then in S43, the CPU 11 of the multi-function device 100 transmits ten bytes of dummy data to the personal computer 50. After completing the transmission of dummy data, the program proceeds to S44. In S44, the CPU 11 retrieves the time presently indicated by the clock circuit 26, and starts measurement of the time represented by the value in the timer counter 14c. The CPU 11 monitors the time indicated by the block circuit 26, and waits for the time, represented by the value in the timer counter 14c, to elapse from when the transmission of dummy data is completed, that is, from the time indicated by the clock circuit 26 as retrieved in S44 (No in S45). Once the time represented by the value in the timer counter 14c has elapsed (S45;YES), then in S46, the CPU 11 judges whether or not a time-out error signal has been received from the personal computer 50. If no time-out error signal has been received from the personal computer 50 (S46;NO), then in S47, the value of the number of transmissions counter 14d is decreased by one to update the remaining number of times that the dummy data is to be transmitted to the personal computer 50. After the process in S47, then in S48, the CPU 11 determines whether or not the resultant value in the number of transmissions counter 14d reaches zero (0). If not (S48;No), then the CPU 11 knows that dummy data has not yet been transmitted to the personal computer 50 five times, so the program returns to S43, whereupon dummy data is again transmitted to the personal computer 50 at the time interval presently set in the timer counter 14c.

On the other hand, when the value of the number of transmissions counter 14d reaches zero (S48:YES), this means that dummy data has been transmitted to the personal computer 50 five times at the time interval presently set in the timer counter 140. Accordingly, in S49, the CPU 11 again writes the value of "5" in the number of transmissions counter 14d. Then, in S50, the CPU 11 increases the value in the timer counter 14c by the value of 500 ms in order to increase the time interval (transmission interval) between successive transmissions of dummy data. Next, the program returns to S43, whereupon dummy data in transmitted to the personal computer 50 at transmission intervals increased by the 500 ms value.

Thus, by repeatedly performing the processes in S43 through S50, the interval at which successive sets of dummy data are transmitted can be repeatedly increased by 500 ms until a time-out error signal is received from the personal computer 50.

If a time-out error signal is received from the personal computer 50 (S46:YES), then in S51, the CPU 11 subtracts the value of 500 ms from the value presently stored in the timer counter 14c. The CPU 11 then writes the resultant value in the transfer interval counter 13a as a packet data accumulation time t1. Afterwards, the dummy data transmission routine is ended.

In this way, during the dummy data transmission routine of the second embodiment, dummy data is experimentally transmitted to the personal computer 50 each time a transmission interval, presently set in the timer counter 14c, elapses, to thereby judge whether a time-out error signal is generated. When a time-out error signal is received, then a transmission interval, at which dummy data has been transmitted when the error signal is received, is reduced by 500 ms. Then, the packet data accumulation time t1 is determined based on the reduced transmission interval. Further, when no error signal is received from the personal computer 50 after transmitting duty data at the transmission interval set in the timer counter 14c, then the transmission interval is increased and the dummy data is again transmitted to the personal computer 50. By automatically transmitting dummy data while increasing the transmission interval until a time-out error is generated, the optimum transmission interval can be determined.

It is noted that in S44, the time is measured from the instant transmission of dummy data of S43 is completed. However, the time need not be measured from the instant when transmission of dummy data in 543 is completed but could instead be started from the instant when the transmission of dummy data of S43 is started or from the instant when transmission of dummy data of S43 is being executed.

While the invention has been described in detail with reference to the specific embodiments thereof, it would be apparent to those skilled in the art that various changes and modifications may be made therein without departing from the spirit of the invention, the scope of which is defined by the attached claims.

For example, during the transmission routine of FIG. 7, if some transmission data is received up until it is determined that the power source is off or the communication software is not running, the transmission data is deleted before the transmission routine is ended. However, instead, the transmission data received up until these times can be temporarily stored in the image memory 15. Once it is determined that the power source of the personal computer 50 is turned on and the communication software to operating, the transmission data stored in the image memory 15 can be transferred to the personal computer 50.

In the dummy data transmission routine of FIG. 9, the initial transmission interval, at which dummy data in transmitted, is set as one second. The transmission interval, at which dummy data is transmitted, is repeatedly increased by 500 ms until a time-out error signal is received from the personal computer 50. When the time-out error signal in received from the personal computer 50, then the transmission interval, set when the time-out error signal in received, is decreased by 500 ms and stored in the transfer interval counter 13a.

However, instead, as shown in FIG. 10, an initial transmission interval of ten seconds can be set, and the transmission interval can be repeatedly decreased by 500 ms when a time-out error signal is received from the personal computer 50. Once no time-out error signal is received from the personal computer 50 even after dummy data is transmitted, then the transmission interval, set at the time no time-out error signal is received, can then be written in the transform interval counter 13a. The value thus set in the transfer interval counter 13a can be set an the packet data accumulation time t1.

More specifically, the modification of the dummy data transmission routine of FIG. 10 is the same as that of FIG. 9 except for the points described below.

In S42, the timer counter 14c is initially set to 10 s. When some error signal is received from the personal computer 50 (yes in S46), the program proceeds to S47. In S50, the value of 500 ms is subtracted from the present value in the timer counter 14c. When no error signal is received from the personal computer 50 (no in S46), the program proceeds to S51. In S51, the transmission interval, set in the timer counter 14c at the time no time-out error signal is received, is written into the transfer interval counter 13a as the packet data accumulation time t1.

In the above-described embodiments, during the transfer routine of FIG. 7, the packet data accumulation time t1, determined during the dummy data transmission routine, is used as being set in the transfer interval counter 13a. However, instead, the packet data accumulation time t1 can be preset to a fixed value that may not bring the personal computer 50 into the time-out error and used as being set in the transfer interval counter 13a.

With this configuration, the packet data accumulation time t1 is fixed and can be maintained at same fixed value regardless of whether the reception speed is fast or slow. The amount of each packet in determined by the product of the fixed value t1 and the reception speed. Even when the reception speed is slow, data can be transferred to the personal computer 50 in packet units at the properly-set fixed time interval t1 so that the communication software will not generate any time-out error signal.

In the above-described embodiments, transmission data is transmitted according to the transmission standard "Class 2" via the multi-function device 1 to the personal computer 50. However, transmission data may be transmitted according to another transmission standard "Class 1" via the multi-function device 1 to the personal computer 50. Also in this case, the packet data is prepared so that the packet distinction portion 63 store "40H," which indicates also the standard "Class1". According to the standard "Class 1", the multi-function device 1 does not perform the reception speed determining operation in S24 (FIG. 7), but only performs the writing operation to write a determined reception speed in the reception speed counter 14b. The personal computer 50, that is executing the communication software, determines the reception speed. More specifically, the personal computer 50 first transmits, to the multi-function device 1, a command for asking reception speeds, at which the multi-function device 1 can receive transmission data. The multi-function device 1 transmits, to the personal computer 50, a response indicating all the reception speeds (2,400 bps, 4,800 bps, 7,200 bps, 9,600 bps, 12,000 bps, and 14,400 bps, in this example) at which the multi-function device 1 can receive transmission data. The personal computer 50 then determines the maximum reception speed, at which the multi-function device 1 can receive transmission data. Then, the personal computer 50 produces a DIS signal indicative of the maximum reception speed of the multi-function device 1. Then, the personal computer 50 controls the multi-function device 1 to transmit the DIS signal to the remote device 40. When a DCS signal is transmitted from the remote device 40 in response to the DIS signal, the personal computer 50 receives the DIS signal via the multi-function device 1, and determines the reception speed, at which the multi-function device 1 should receive transmission data. The personal computer 50 then controls the multi-function device 1 to receive transmission data at the determined reception speed. As a result, the multi-function device 1 sets the thus determined reception speed to the reception speed counter 14b in S24 and will receive transmission data at that reception speed.

What is claimed is:

1. A multi-function peripheral device, comprising:
   reception means capable of receiving transmission data serially transmitted from a remote device;
   transferring means capable of transferring, to an external device, the received transmission data by successive data units at a time interval, each data unit containing an accumulated amount of the received transmission data;
   means for identifying a reception speed, at which the reception means receives the transmission data;
   changing means for changing, based on the identified reception speed, the amount of the transmission data to be transferred to the external device contained in a data unit, while maintaining a length of the time interval; and
   transfer control means for controlling the transferring means to transfer, to the external device, the received transmission data by successive data units at the maintained length of the time interval, each data unit being comprised of the changed amount of the transmission data.

2. A multi-function peripheral device as claimed in claim 1, wherein the transferring means transfers the transmission data in parallel to the external device.

3. A multi-function peripheral device as claimed in claim 1, wherein the transferring means is capable of transferring, to the external device, the received transmission data by successive data units at a fixed time interval, the transfer control means controlling the transferring means to transfer, to the external device, the received transmission data by successive data units at the fixed time interval, each data unit being comprised of the changed amount of the transmission data.

4. A multi-function peripheral device as claimed in claim 1, wherein the changing means includes:
   transfer timer storing means for storing data of a period of time, during which the serially-received transmission data is accumulated into each of the successive data units; and
   amount changing means for changing the amount of the transmission data, to be accumulated into each data unit, dependently on the identified reception speed and the period of time stored in the transfer time storing means, and
   wherein the transferring means transfers, to the external device, the received transmission data by the successive data units at the time interval, the length of the time interval being equal to the period of time stored in the transfer timer storing means.

5. A multi-function peripheral device as claimed in claim 4, further comprising:
   first transmission means for transmitting dummy data to the external device;
   time measuring means for measuring time elapsing after the first transmission means transmits dummy data to the external device;
   error signal reception means for receiving a time-out error signal from the external device;
   time-out period storing means for, when the error signal reception means receives the time-out error signal, storing data of a time measured by the time measuring means to have elapsed until a time-out error signal is received; and
   first control means for controlling the transfer timer storing means to store data of the period of time, during which transmission data is to be accumulated into each data unit, based on data of the time stored in the time-out period storing means.

6. A multi-function peripheral device as claimed in claim 4, further comprising:
   second transmission means for repeatedly transmitting dummy data to the external device at a time interval;
   first transmission time interval storage means for storing data of the time interval, at which the second transmission means transmits dummy data;
   first error signal reception means capable of receiving a time-out error signal from the external device; and
   second control means for, when the time-out error signal is received, controlling the transfer timer storing means to store the time period, during which transmission data is to be accumulated into each data unit, based on the time interval stored in the first transmission time interval storage means.

7. A multi-function peripheral device as claimed in claim 6, further comprising third control means for, when no time-out error signal is received, increasing the time interval stored in the first transmission time interval storage means and controlling the second transmission means to transmit dummy data to the external device at the increased time interval presently stored in the first transmission time interval storage means.

8. A multi-function peripheral device as claimed in claim 4, further comprising:

third transmission means for repeatedly transmitting dummy data to the external device at a time interval;

second transmission time interval storage means for storing data of the time interval, at which the third transmission means transmits dummy data;

second error signal reception means capable of receiving a time-out error signal from the external device; and fourth control means for, when no time-out error signal is received, controlling the transfer timer storing means to store the time period, during which transmission data is to be accumulated into each data unit, based on the time interval stored in the second transmission time interval storage means.

9. A multi-function peripheral device as claimed in claim 8, further comprising fifth control means for, when a time-out error signal is received, decreasing the time interval stored in the second transmission time interval storage means and controlling the third transmission means to transmit dummy data to the external device at the decreased time interval presently stored in the second transmission time interval.

10. A multi-function peripheral device as claimed in claim 4, wherein the amount changing means determines the amount of the transmission data, based on a product of the identified reception speed and the period of time stored in the transfer time storing means.

11. A multi-function peripheral device as claimed in claim 4, further comprising:

dummy data transmission means for transmitting dummy data to the external device;

error signal reception means capable of receiving a time-out error signal from the external device; and time setting means for determining the period of time, during which transmission data is to be accumulated into each data unit, based on whether or not the error signal reception means receives the error signal, the time setting means storing data of the determined period of time in the transfer timer storing means.

12. A multi-function peripheral device, comprising:

a reception portion capable of receiving transmission data serially transmitted from a remote device;

a transfer portion capable of transferring, to an external device, the received transmission data by successive data units at a time interval, each data unit containing an accumulated amount of the received transmission data;

a speed identifying unit identifying a reception speed, at which the reception portion receives the transmission data;

a changing unit changing, based on the identified reception speed, the amount of the transmission data to be transferred to the external device contained in a data unit, while maintaining length of the time interval; and a transferring-control unit controlling the transfer portion to transfer, to the external device, the received transmission data by successive data units at the maintained time interval, each data unit being comprised of the changed amount of the transmission data.

13. A multi-function peripheral device as claimed in claim 12, wherein the transferring unit transfers the transmission data in parallel to the external device.

14. A multi-function peripheral device as claimed in claim 12, wherein the transfer portion is capable of transferring, to the external device, the received transmission data by successive data units at a fixed time interval, the transferring-control unit controlling the transfer portion to transfer, to the external device, the received transmission data by successive data units at the fixed time interval, each data unit being comprised of the changed amount of the transmission data.

15. A multi-function peripheral device as claimed in claim 12, wherein the changing unit includes:

a transfer timer storing portion for storing data of a period of time, during which the serially-received transmission data is accumulated into each of the successive data units; and an amount changing portion for changing the amount of the transmission data, to be accumulated into each data unit, dependently on the identified reception speed and the period of time stored in the transfer time storing portion, and wherein the transfer portion transfers, to the external device, the received transmission data by the successive data units at the time interval, the length of the time interval being equal to the period of time stored in the transfer timer storing portion.

16. A multi-function peripheral device as claimed in claim 15, wherein the amount changing portion calculates the amount of the transmission data, based on a product of the identified reception speed and the period of time stored in the transfer time storing portion.

17. A multi-function peripheral device as claimed in claim 15, further comprising:

a dummy data transmission unit transmitting dummy data to the external device;

an error signal reception unit capable of receiving a time-out error signal from the external device; and a time setting unit determining the period of time, during which transmission data is to be accumulated into each data unit, based on whether or not the error signal reception unit receives the error signal, the time setting unit storing data of the determined period of time in the transfer timer storing portion.

* * * * *